Aug. 13, 1946.     C. E. WELLER     2,405,866
ELECTRICAL HEATING APPARATUS
Filed July 14, 1941     2 Sheets-Sheet 2
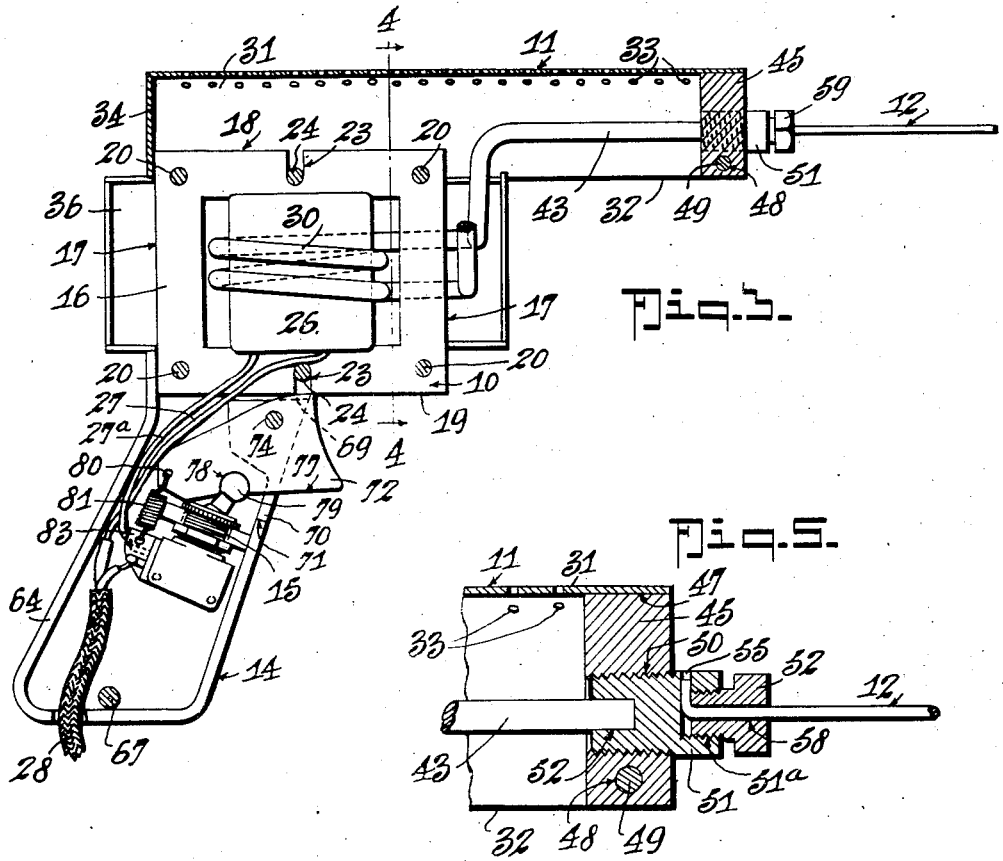
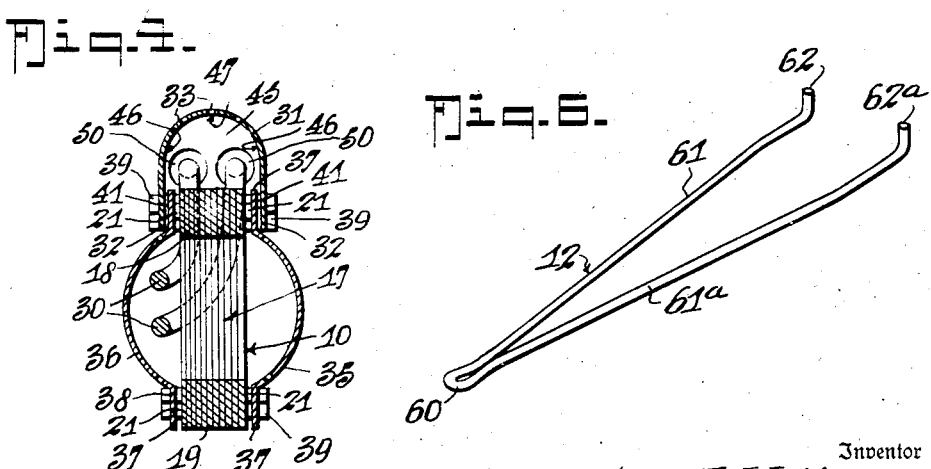
Inventor
Carl E. Weller.

Patented Aug. 13, 1946

2,405,866

UNITED STATES PATENT OFFICE 2,405,866

ELECTRICAL HEATING APPARATUS

Carl E. Weller, Easton, Pa.

Application July 14, 1941, Serial No. 402,372

4 Claims. (Cl. 219—26)

This invention relates to electrically heated apparatus and more particularly to electrically heated soldering apparatus for intermittent use.

An object of the invention is to provide an electrically heated apparatus which will be simple and durable in construction, convenient in design and efficient and economical in operation.

Another object of the invention is to provide in a soldering iron an easily tinnable tip which may be heated quickly and with a minimum current consumption.

Another object of the invention is to provide a well ventilated soldering iron to the end that the heat of frequent intermittent or long continued use will be advantageously rapidly conducted away from the leads of the iron.

Another object of the invention is to provide in an electric soldering iron a control switch of convenient and efficient design.

The invention contemplates a soldering iron of pistol-grip type, having a readily renewable tinned copper tip at one end, a finger-actuated control switch comprising toggle and spring lever elements at the other end, and an intermediate step-down transformer unit, the whole characterized by perforated sheet metal ventilating shields for cooling the tip and transformer.

The invention will be readily understood by referring to the following detailed specification including the several drawings forming part thereof, wherein Fig. 1 shows in side elevation the exterior of an electric soldering iron constituting a preferred embodiment of the invention;

Fig. 3 is a side sectional view corresponding to Fig. 1 but showing portions removed to illustrate the interior disposition of the elements;

Fig. 4 is a section taken on the line 4—4, of Fig. 3;

Fig. 5 is an enlarged sectional view, fragmentarily showing the frontal tip mounting; and Fig. 6 is a detail perspective of a tinned copper tip.

Figure 1:
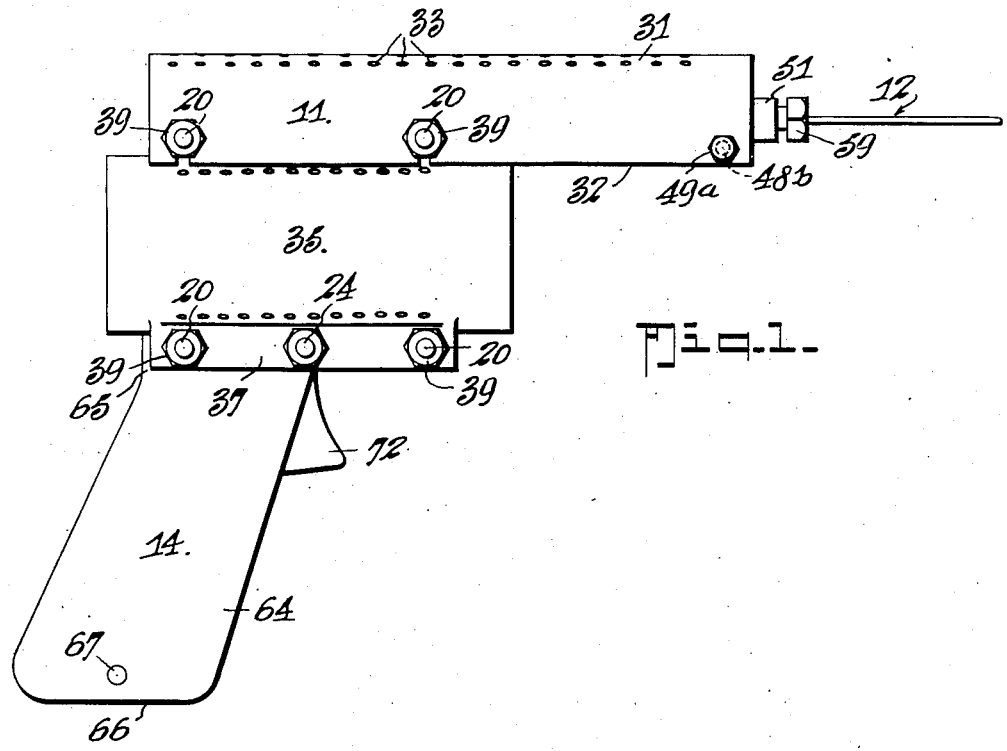
Figure 2:
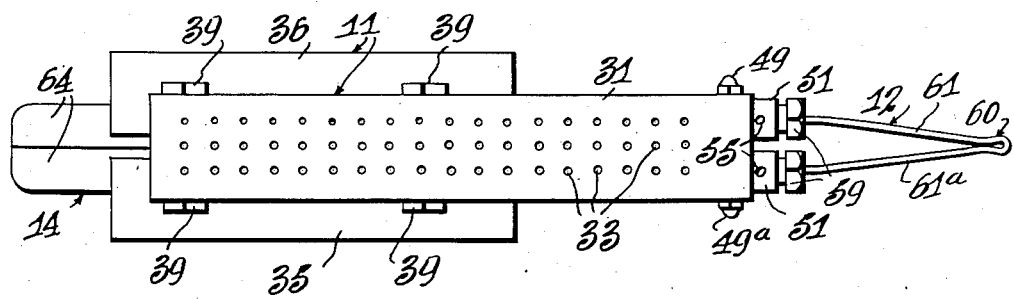
Fig. 2 is a top plan view of the iron shown in Fig. 1.

Referring to the drawings wherein identical parts are indicated by similar reference numerals, a step-down transformer 10 is enclosed by shielding 11 carrying at the forward end tip 12 and at the other end handle 14 containing switch 15.

Transformer 10 includes a rectangular frame 16 of laminated iron which may be of any desirable dimension and construction. It has been found convenient to employ for this purpose one inch scrapless punching and stacked ⅝ inch steel. Frame 16 includes opposite ends 17—17, top 18 and bottom 19, the laminae being assembled by spaced corner bolts 20, 20 tightened by nuts 21, 21. Top and bottom portions of frame 16 include vertical slots 23—23 for receiving bolts 24. Primary winding 26 of the transformer is designed to use 115 volt alternating current, although, of course, the invention is not limited thereto. Leads 27 and 27a connect the transformer to conductor cord 28 attached at any suitable source of electrical power not shown. Transformer secondary winding 30 is designed to furnish 200 amperes at one-quarter volt. In one satisfactory embodiment the primary winding 26 includes 880 turns of #27 wire while secondary winding consists of 2 turns of #5 B. & S. gauge.

Shielding 11 for ventilating and dissipating heat is preferably of sheet copper which, for example, may be .025 inch in thickness. The shielding includes an upper hood 31 of elongated form having lower straight edges 32 and a number of perforations 33 disposed therealong in order to insure full ventilation. The hood is closed rearwardly with a plate 34 and therebelow connects with opposite curved side plates 35 and 36 having parallel upper and lower flanges 37. Holes 38 in said flanges receive bolts 20 fitted with outer nuts 39. By referring to Fig. 4 it will be observed that the side plates are assembled on the laminated core or frame and within the parallel edges 32 of the upper hood and spaced from said hood by insulation elements 41. Curved side plates 35 are provided with a plurality of spaced perforations arranged, for example, in upper and lower rows for ventilation.

The tip 12 of the soldering iron constitutes a forward extension 43 of the secondary leads, such forward extensions being closely engaged by a forward retaining wall 45. Retaining wall 45 is preferably of porcelain or asbestos and it will be observed that its design assists in conducting heat away from the leads to the ventilating shield, as well as preventing heat from developing rearward thereof. While the invention, of course, is not limited to the use of asbestos or porcelain, in this connection it is desirable that the material constituting wall 45 be a good heat conductor and insulator. Wall 45 has opposite parallel sides 46 and a curved top 47 fitting within ventilating hood 31. Wall bottom 48 has a transverse recess 48a aligning with opposite holes 48b in shield edges 32 for receiving a headed bolt 49 assembled therein and tightened by nut 49a. Wall 45 is provided with equally spaced parallel holes 50—50 for receiving each a plug 51. Plug 51 in turn is provided with a recess 51a to receive externally threaded plug 52. The opposite face of plug 51 has recess 53 in which the extremity of secondary lead 43 is intimately engaged. A radial hole 55 drilled in the forward portion of plug 51 is aligned with axial recess 58 for tightly securing tip 12 when the externally threaded plug 52 is tightened. Plug 52 has an hexagonal head 59 for ready plier or wrench turning. Tip 12 it will be observed, constitutes a shunt conductor across the secondary winding, the V-shaped extremity 60 being tinned and diverging shanks 61 and 61a having upturned rearward extremities 62 and 62a fixed in radial holes 55—55.

Handle 14 includes aluminum castings 64—64 comprising top 65 and bottom 66, the inturned edges of each casting abutting to provide suitable switch storage space, the handle being assembled by rivets or screws 67. Handle sections 64 include extensions 69 at the top having suitable holes for receiving the lower assembly bolts 20—20. Each casting is recessed forwardly at 70 in order to provide vertical slot 71 for receiving finger-actuated trigger 72.

Desirable intermittent operation of the soldering iron is very conveniently obtained by inward and outward movement of trigger 72, the same being pivotally mounted on pins 74 fixed in the opposite castings. The trigger has a curved forward face for comfortably accommodating the operator's finger at the grip and a lower straight edge 77 having a socket 78 in which is mounted ball head 79 of switch 15. At the rearward end trigger 72 has recess 80 for receiving one end of tension spring 81, the other end of the spring being fast in fixed bracket 83, see Fig. 3. It will be observed the tension of the spring 81 is such as normally to thrust trigger 72 outwardly, thus opening switch 15, the current being normally cut off. In operation the soldering iron is heated by tightening the finger grip on the trigger 72, pulling the latter against the spring tension and causing current to flow through the transformer and rapidly heat the tip 12. When the pressure on the trigger is released, spring 81 throws the trigger forwardly and reopens the switch, thus cutting off the flow of current to the tip.

From the foregoing it will be observed that the conventional alloy tips are dispensed with. By substituting copper wire for alloy tips tinning of the tip is facilitated. The copper material of the tips is quite cheap and deterioration is readily corrected by replacing the tip. Replacement of a copper tip is easily accomplished since it is necessary only to loosen plugs 52 and withdraw the old copper tip. The ends of the new copper tip may then be inserted through axial bore 58, the turned up ends 62 and 62a being then rigidly tightened into position by taking up on plugs 52, the soldering iron being thus almost instantly ready for use. Preferably the secondary winding at the transformer side of wall 45 is much heavier than the wire of tip 12.

The automatic cut-off switch assembly 15 is desirable to insure safety while the reduction from generator to tinned tip insures a considerable saving of time and current in intermittent operation.

It will be understood that the specific details of construction set forth hereinabove describe merely one preferred form of the invention which is capable of many other modifications; hence the invention is not to be limited other than by the spirit and scope of the appended claims.

What is claimed is:

1. An electrical heating apparatus comprising a quick-heating soldering iron including a step-down transformer having primary and secondary turns, said secondary turns being of pronouncedly greater cross-sectional area than said primary turns, and a detachable heating tip rigidly mounted and held tightly in electrical communication with the secondary winding, said heating tip being of pronouncedly smaller cross-sectional area than the secondary winding.

2. An electrical heating apparatus comprising a quick-heating soldering iron including a step-down transformer having primary and secondary turns, said secondary turns being of pronouncedly greater cross-sectional area than said primary turns, a detachable heating tip held tightly in electrical communication with the secondary winding, said heating tip being of pronouncedly smaller cross-sectional area than the secondary winding, and a threaded take-up connection for rigidly connecting the detachable soldering tip electrically to communicate with the secondary winding.

3. An electrical heating apparatus comprising a quick-heating soldering iron including a step-down transformer having primary and secondary turns, said secondary turns being of pronouncedly greater cross-sectional area than said primary turns, a detachable tinnable copper heating tip rigidly mounted and held tightly in electrical communication with the secondary winding, spaced integral offset portions on said tip, said tinnable copper tip being of pronouncedly smaller cross-sectional area than said secondary winding, spaced fixed plugs maintained tightly in electrical communication with the ends of the secondary winding and each having a transverse recess for receiving an offset portion of the tip, and threaded take-up means in each plug for rigidly mounting the tip therein.

4. A quick-heating soldering iron having spaced end portions, a center portion therebetween, a step-down transformer having primary and secondary windings in the center portion, a pistol-grip containing an off-on trigger switch on one of said end portions, said switch for controlling said transformer, spaced secondary winding extensions fixed in the other of said end portions, and a detachable substantially V-shaped wire heating tip held tightly in electrical communication with the secondary winding extensions and projecting from the last-mentioned end portion, said heating tip being of pronouncedly smaller cross-sectional area than said secondary winding extensions; and a casing for the central portion enclosing said transformer.

CARL E. WELLER.